US011251954B2

(12) United States Patent
Dolev et al.

(10) Patent No.: US 11,251,954 B2
(45) Date of Patent: Feb. 15, 2022

(54) METHOD AND SYSTEM FOR PERFORMING BROADCAST ENCRYPTION WITH REVOCATION CAPABILITY

(71) Applicant: B. G. NEGEV TECHNOLOGIES AND APPLICATIONS LTD., AT BEN-GURION UNIVERSITY, Beer Sheva (IL)

(72) Inventors: Shiomi Dolev, Omer (IL); Niv Gilboa, Tel Aviv (IL); Dan Brownstein, Givatayim (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 24 days.

(21) Appl. No.: 16/611,032

(22) PCT Filed: May 10, 2018

(86) PCT No.: PCT/IL2018/050510
§ 371 (c)(1),
(2) Date: Nov. 5, 2019

(87) PCT Pub. No.: WO2018/207187
PCT Pub. Date: Nov. 15, 2018

(65) Prior Publication Data
US 2020/0186347 A1   Jun. 11, 2020

Related U.S. Application Data

(60) Provisional application No. 62/503,696, filed on May 10, 2017, provisional application No. 62/544,936, filed on Aug. 14, 2017.

(51) Int. Cl.
*H04L 9/30* (2006.01)
*H04N 21/2347* (2011.01)

(52) U.S. Cl.
CPC ....... *H04L 9/3073* (2013.01); *H04N 21/2347* (2013.01); *H04L 2209/601* (2013.01)

(58) Field of Classification Search
CPC ............ H04L 9/3073; H04L 2209/601; H04N 21/2347; H04N 21/23895; H04N 21/2585;
(Continued)

(56) References Cited

U.S. PATENT DOCUMENTS 6,397,329 B1 * 5/2002 Aiello .................. H04L 9/3265
713/155
2008/0298582 A1 * 12/2008 Sakai ................... H04L 9/3073
380/44
(Continued)

FOREIGN PATENT DOCUMENTS

WO   2013/027206 A1   2/2013
WO   2016/189105 A1   12/2016

OTHER PUBLICATIONS

International Search Report for PCT/IL2018/050510, dated Jul. 30, 2018, 4 pages.
(Continued)

*Primary Examiner* — Mohammad W Reza
(74) *Attorney, Agent, or Firm* — Roach, Brown, McCarthy & Gruber, P.C.; Kevin D. McCarthy (57) ABSTRACT

A broadcast encryption method that allows a broadcaster to send encrypted content to a set of users such that only a subset of authorized users can decrypt the content, and to perform both temporary and permanent revocation of users. Accordingly, during a Setup stage, a Key Service generates a public key and a Master Secret Key (MSK) and sends the Public Parameters PP used to generate the public key to a broadcaster and to all users. The broadcaster uses the Public Parameters PP to create a message M, with which the broadcaster encrypts the content, and further creates a
(Continued)

Cipher Text (CT), which is sent to all users. During a Key Gen stage, whenever a user wishes to decrypt the message M for decrypting the content, the user sends a request with his ID1 to the Key Service. The Key Service generates a corresponding secret key $SK_{ID1}$ and the secret key $SK_{ID1}$ is sent to the user ID1 via a secure data channel. During a Decrypt stage, the user uses the secret key $SK_{ID1}$, to decrypt the Cipher Text (CT) and obtain the message M. During a Revoke stage of k users (k=1, 2, 3, . . . ) a State Update Message (SUM) which is sent to all users, is provided and each user updates his state with the SUM he received, such that the k users having identities $ID_1$, $ID_2$, . . . $ID_k$ will not be able to update their state and will be permanently revoked, while all the remaining users being admitted users will be able to update their state and will not be revoked. Temporary revocation is done by inserting a list of IDs ($ID_1$, $ID_2$, . . . $ID_k$) to be revoked into the CT.

9 Claims, 3 Drawing Sheets

(58) Field of Classification Search
CPC ....... H04N 21/43853; H04N 21/63345; H04N 21/258; H04N 21/266

USPC ........................................................ 380/210
See application file for complete search history.

(56) References Cited

U.S. PATENT DOCUMENTS

| | | |
|---|---|---|
| 2009/0138704 A1* | 5/2009 | Delerablee ............ H04L 9/0891 713/158 |
| 2012/0257756 A1 | 10/2012 | Huang et al. |
| 2013/0308776 A1 | 11/2013 | Delerablee et al. |
| 2014/0226816 A1 | 8/2014 | Dolev et al. |
| 2017/0359315 A1* | 12/2017 | Zhang ................... B29C 64/386 |

OTHER PUBLICATIONS

Written Opinion of the International Searching Authority for PCT/IL2018/050510, dated Jul. 30, 2018, 5 pages.
Pascal Junod et al., "An efficient public-key attribute-based broadcast encryption scheme allowing arbitrary access policies" 10th Annual ACM Workshop on Digital Rights Management 2010, Oct. 4, 2010), 13 pages.
Hartono Kumio et al., "Efficient Revocation Schemes for Secure Multicase" Dec. 31, 2001, 21 pages.

* cited by examiner

METHOD AND SYSTEM FOR PERFORMING BROADCAST ENCRYPTION WITH REVOCATION CAPABILITY

FIELD OF THE INVENTION

The invention relates to the field of broadcast communication networks. Specifically the invention relates to the field of broadcast encryption with both temporary and permanent revocation capability.

BACKGROUND OF THE INVENTION

In broadcast encryption a single broadcaster can send encrypted messages to a group of users so that only authorized users can decrypt the messages. Such message may be for example, a secret key for decrypting content, such as a movie, which should be available for decryption only for subscribers (users) who paid a required fee to the content provider. Since the introduction of broadcast encryption there has been a great deal of work on extending the framework of broadcast encryption, thereby improving its security and optimizing its performance.

One of the factors driving interest in broadcast encryption is its commercial importance in content distribution, e.g. television networks. Historically, such networks were developed and administered by a single broadcaster who distributed both content and keys to registered users. In this setting, symmetric-key encryption is normally used, in which the broadcaster holds all the keys of the receivers.

A more flexible system allows separating between the key distribution and content distribution functions. In this setting, a single key manager generates and distributes keys to all users (subscribers), but multiple content providers can directly send encrypted content to users. The benefits of such an approach include lower barriers of entry for both key providers and content providers and potentially greater choice and lower cost for users. However, the separation of functions typically rules out symmetric-key encryption since the key manager would not want to share all the system's keys with a content provider.

Public-key broadcast encryption solves this problem by separating the keys into a public key and secret keys. The public key allows a content provider to encrypt content and the secret keys allow each authorized user to decrypt content.

Broadcast encryption schemes differ in the way that they determine authorized users. Upon joining the system (e.g., during a registration stage), a user is authorized to receive a subset of the distributed content (for example, a package of sports channels). This authorization is enforced by the keys that the key manager provides to the user. The key manager can decide to expand the subset of the content for which the user is authorized by providing additional keys. However, reducing the user's authorization or completely revoking that authorization requires a revocation procedure that invalidates the user's decryption keys.

Revocation in broadcast encryption schemes can generally be divided into two types, temporary revocation and permanent revocation. Typical revocation schemes for broadcast encryption are limited either to temporary revocation only or to permanent revocation only, often without explicitly stating the difference. However, in practice, both types of revocation are important.

Temporary Revocation

In temporary revocation, authorization is attached to a specific encrypted message and therefore revoking a user does not extend to subsequent messages. When using temporary revocation, the broadcaster must know which user will be able to decrypt the transmitted content and which user will not, and encrypt the content accordingly. Temporary revocation is required for example, when a user wishes to remain a subscriber, but does not want to receive a specific content (e.g., sports channels). In this case, he will be temporary revoked and will not be able to decrypt messages that are related to sports channels. However, a revoked user is temporarily revoked in each message and the public key that is used for encryption must contain the information who will and who will not be able to decrypt and therefore, when more and more users are revoked or authorized, the encryption (public) key becomes larger and larger. Also, temporary revocation approach suffers from two drawbacks. The first drawback is performance penalty, since the complexity of sending a message keeps growing as a function of historical revocations. The other drawback is that when the roles of key management and content distribution are separate, it may not be possible for a broadcaster to keep track of every revoked user. In addition, temporary revocation requires maintaining long lists of subscribers, which introduce substantial overhead both during encryption and decryption, as well as security problems (since these lists may leak is adversaries get access to them).

Permanent Revocation

In permanent revocation, the key manager revokes the authorization of a user, thereby preventing him from decrypting future messages (it is practically equivalent to taking back hardware from the user, such as his set-top box).

Permanent revocation may be the consequence of a user canceling his subscription and is therefore, a common feature of real-world broadcast encryption systems. A motivating example for temporary revocation is when a content provider distributes an encryption key for some premium content (e.g., a televised pay-per-view event), only to users who paid for the content. Subsequently, the content is broadcasted to all users in the system, but only the users who received the content key can decrypt it. In encryption schemes that use permanent revocation, the public key that is used for encryption is independent of the number of users (subscribers) which should be revoked. Also, each time a broadcaster starts encrypting a new content (e.g., a movie), encryption is made with respect to a current state. When a broadcaster wishes to determine which user will remain a subscriber and who will be revoked (e.g., if he stopped paying the required subscription fee), he can send a message containing state parameters to all users and as a result, only users that paid the fee will be able to update their state and remain subscribers and all the others will be revoked. This message is sent to all users every time the broadcaster wishes to revoke users. In order to remain a subscriber, upon receiving the message, each user must update his state. This way, all users that stopped paying the required subscription fee will be permanently revoked and will not be able to decrypt the message or any subsequent messages (unless performing the required registration process, like any new subscriber).

The security of broadcast encryption can be loosely defined as the property of non-authorized users being unable to decrypt ciphertexts and can be typically reduced to the security of a cryptographic primitive. Security definitions for broadcast security, differ in modeling the adversary. One feature of the adversary model is the number of users that the adversary may corrupt. Most broadcast encryption schemes assume that the adversary can control multiple users (possibly, an unbounded number of them) and therefore, require collusion resistance (i.e. require that even a coalition of unauthorized users working together cannot decrypt ciphertexts). A second feature determines whether the adversary (and the associated security proof) is adaptive or is only selective. An adaptive adversary decides dynamically which users to corrupt while in the selective setting the adversary selects the set of corrupted users before the key manager sets system parameters.

The performance of broadcast encryption is measured by the size of the objects in the system and the time required to perform the algorithms in the scheme as a function of the n users in the system and the number of revoked users. The measured objects include encryption and decryption keys, ciphertext length and messages for user revocation, which are part of the ciphertext in the case of temporary revocation and are separate from the ciphertext, for permanent revocation.

The performance of different broadcast encryption schemes is sometimes difficult to compare because each optimizes different measures. For example, the simplest broadcast encryption scheme involves encrypting a plaintext message separately with each authorized user's symmetric/public key. In this scheme, the encryption key, ciphertext length and time to perform encryption are $O(n-r)$ for n users in the system and r revoked users. However, all other measures are $O(1)$ and revocation is especially trivial for all users actually requiring less work for the key manager and broadcaster.

Important broadcasting parameters in these broadcasting schemes are the size of the public key that is used for encryption, the size of the secret key used for decryption and the size of the content. It is desired that encryption will require as less data traffic, as possible.

WO 2013/027206 discloses a method for broadcast encryption that allows a broadcaster to send encrypted data to a set of users such that only a subset of authorized users can decrypt said data. The method comprises modifications to the four stages of the basic Cipher-text Policy Attribute-Based Encryption techniques. It then claimed that the method can be adapted to transform any Attribute-Based Encryption scheme that supports only temporary revocation into a scheme that supports the permanent revocation of users.

According to this method, a part of each decryption key will be dynamic and each time a message is sent to a user, the key is updated, such that only users that should not be permanently revoked will be able to update his state (the broadcaster sends to each user a private key that includes the attributes of the user and a component that includes the state of the user, which is a function of a random control component that is frequently updated from the moment that the user completed a registration process and became a subscriber).

Another problem with the method proposed by WO 2013/027206 is related to security, since there may be collusion between an authorized subscriber who received the secret key for decryption (who is able to update his state) and a revoked subscriber. In this case, the revoked subscriber can learn from the authorized subscriber what should be the new updated state and continue decrypting, like he has been never revoked.

It is clear that permanent revocation alone is not sufficient, since there are situations when a broadcaster wishes to revoke a user just temporarily. Therefore, both types of revocations are required.

It is therefore an object of the present invention to provide a broadcast encryption scheme that overcomes the drawbacks of typical revocation schemes for broadcast encryption.

It is another object of the present invention to provide a broadcast encryption scheme that enables both temporary and permanent revocation, while keeping performance that is as good as broadcast encryption systems that achieve either temporary revocation or permanent revocation, separately.

It is another object of the present invention to provide a broadcast encryption scheme that enables both temporary and permanent revocation but prevent revoked users from decrypting messages, even in case of collusion between revoked users and users who can decrypt.

Other objects and advantages of the invention will become apparent as the description proceeds.

SUMMARY OF THE INVENTION

A broadcast encryption method that allows a broadcaster to send encrypted content to a set of users such that only a subset of authorized users can decrypt the content, and to perform both temporary and permanent revocation of users, comprising the following steps:
a) during a Setup stage:
  a.1) a KeyService generates a public key and a Master Secret Key (MSK) and sends the Public Parameters PP used to generate the public key to a broadcaster and to all users;
  a.2) the broadcaster uses the Public Parameters PP to create a message M, with which the broadcaster encrypts the content, and further creates a Cipher-Text (CT), which is sent to all users;
b) during a KeyGen stage:
  b.1) whenever a user wishes to decrypt the message M for decrypting the content, the user sends a request with his ID1 to the KeyService;
  b.2) the KeyService generates a corresponding secret key $SK_{ID1}$;
  b.3) the secret key $SK_{ID1}$ is sent to the user ID1 via a secure data channel;
c) during a Decrypt stage, the user uses the secret key $SK_{ID1}$, to decrypt the CipherText (CT) and obtain the message M; and
d) during a Revoke stage of k users (k=1, 2, 3, ... ):
  d.1) providing a State Update Message (SUM) which is sent to all users;
  d.2) allowing each user to update his state with the SUM he received, such that the k users having identities ID1, ID2, ... $ID_k$ will not be able to update their state and will be permanently revoked, while all the remaining users being admitted users will be able to update their state and will not be revoked.

In one aspect, temporary revocation is performed by inserting a list of IDs ($ID_1$, $ID_2$, ... $ID_k$) to be revoked into the CT. The revocation scheme may be Cipher-text Policy Attribute-Based Encryption (CP-ABE). The CP-ABE scheme further includes permanent revocation parameters, which are directed to specific users.

The CP-ABE scheme may further include permanent revocation parameters, which are directed to specific attributes of specific users.

A user can decrypt the ciphertext only if he is not one of the temporarily revoked users.

Revocation may be carried our using a Public Key Revocation Scheme, consisting of:

a) a Setup($\lambda$) algorithm, which for a security parameter $\lambda$:
  a.1) chooses a bilinear group G of prime order p such that $|p| \geq \lambda$.
  a.2) chooses random generators g, $w \in G$, random exponents $\alpha, \gamma, b \in Z_p$ and sets ST=1.
  a.3) randomly chooses a function $\phi^8$ from $F_\lambda$, a pseudorandom family of permutations over $Z_p$, wherein the Master secret key MSK is MSK=$(\alpha, b, \gamma, w, ST, \phi)$, and the public parameters PP are PP=$(g, g^{bST}, g^{b^2 ST}, w^b, e(g,g)^{\alpha ST})$.

b) a KeyGen(MSK, ID) algorithm, which for Given a user identity $ID \in Z_p$ and the master secret key MSK:
  b.1) computes=$\phi(ID) \in Z_p$; and
  b.2) sets $D_1 = g^{-t}, D_2 = (g^{bID} w)^t$, $$D_3 = \frac{1}{\alpha + b^2 t} - \gamma,$$

$D_4 = g^{(\alpha + b^2 t) \cdot ST}, D_5 = \text{false}$.
  b.3) outputs $SK_{ID} = \{D_1, \ldots, D_5\}$.

c) a Revoke(S,PP,MSK) algorithm, which is adapted to:
  c.1) change the state is by sending a single message that is sent to all users in parallel; given a set $S = \{ID_1, \ldots, ID_r\}$ of identities to revoke, the public parameters and the master secret key. The algorithm sets ST'=ST and for =1 to r, computes:

$$ST' = ST' \cdot (\alpha + b^2 t_i)$$
$$S_{i,1} = \frac{1}{\alpha + b^2 t_i} - \gamma, \quad S_{i,2} = g^{ST'}$$

c.2) whenever $t_i = \phi(ID_i)$, perform the following operations:
  Update the master secret key by replacing ST with ST';
  Update the public parameters by replacing $g^{bST}, g^{b^2 ST}$ and $e(g,g)^{\alpha ST}$ with $g^{bST'}, g^{b^2 ST'}$ and $e(g,g)^{\alpha ST'}$ respectively.
  Broadcast the key update message SUM=$\{S_{i,1}, S_{i,2}\}_{i=1}^r$.

d) An UpdateKey ($SK_{ID}$,SUM,ID) algorithm, which is adapted to:
  d.1) follow the Revoke stage and provides indication regarding how any user updated his state after receiving a Revoke message;
  d.2) Given a key update message SUM for r revoked identities, update the secret key $SK_{ID}$.

e) An Encrypt(S,PP,M) algorithm for allowing the broadcaster who creates the content also encrypts it, based on the public parameters PP, a message $M \in G_T$ and a set S of revoked identities as an input.

f) a Decrypt($SK_{ID}$,CT,PP) algorithm which attempts to retrieve the message M, based on a secret key $SK_{ID}$, a ciphertext CT and the public parameters PP.

Permanent revocation of specific attributes of users may be done directly in the revocation mechanism, without the need of providing new secret keys.

A broadcast encryption system that allows a broadcaster to send encrypted content to a set of users such that only a subset of authorized users can decrypt the content, and to perform both temporary and permanent revocation of users, which comprises:

a) a broadcasting server, having at least one processor, for:
  a.1) obtaining content to be distributed to the authorized users;
  a.2) obtaining encryption and decryption keys required for encrypting the content from a KeyService server;
  a.3) encrypting the content and distributing the content to the authorized users,
  wherein the broadcasting and KeyService servers are adapted to:
b) during a Setup stage:
  a.1) the KeyService generates a public key and a Master Secret Key (MSK) and sends the Public Parameters PP used to generate the public key to a broadcaster and to all users;
  a.2) the broadcaster uses the Public Parameters PP to create a message M, with which the broadcaster encrypts the content, and further creates a CipherText (CT), which is sent to all users;
c) during a KeyGen stage:
  c.1) whenever a user wishes to decrypt the message M for decrypting the content, the user sends a request with his ID1 to the KeyService;
  c.2) the KeyService generates a corresponding secret key $SK_{ID1}$;
  c.3) the secret key $SK_{ID1}$ is sent to the user ID1 via a secure data channel;
d) during a Decrypt stage, the user uses the secret key $SK_{ID1}$, to decrypt the CipherText (CT) and obtain the message M; and
e) during a Revoke stage of k users (k=1, 2, 3, ...):
  e.1) providing by the KeyService, a State Update Message (SUM) which is sent to all users;
  e.2) allowing each user to update his state with the SUM he received, such that the k users having identities ID1, ID2, ... IDk will not be able to update their state and will be permanently revoked, while all the remaining users being admitted users will be able to update their state and will not be revoked.

In one aspect, the KeyService may operate separately from the broadcaster, and performs one or more of the following:

a) generating and distributing Keys both to the broadcaster and to users who became subscribers, according to their attributes;
b) conducting billing operations for admitted users who registered and payed for their subscription; and
c) using the billing data for maintaining admitted users that paid for subscription, and for revocation of users who stopped paying.

DETAILED DESCRIPTION OF THE INVENTION

Reference will now be made to an embodiment of the present invention, examples of which are provided in the accompanying figures for purposes of illustration only. One skilled in the art will readily recognize from the following description that alternative embodiments of the structures and methods exemplified herein may be employed, mutatis mutandis, without departing from the principles of the invention.

The invention proposes a broadcast encryption scheme, bases on public-key that enables both temporary and permanent revocation with performance that in every measure is as good as broadcast encryption systems that achieve either temporary revocation or permanent revocation separately.

At a high level, a broadcast encryption scheme with temporary and permanent revocation is defined as a protocol between a key manager, n receivers (or users) and an unbounded number of broadcasters. In some embodiments, the protocol includes six steps, each implemented with an algorithm: setup, key generation, encryption, decryption, (permanent) revocation and key update.

The proposed scheme may incorporate Cipher-text Policy Attribute-Based Encryption (CP-ABE—where a user has to possess a certain set of attributes in order to access data) techniques, to achieve temporary revocation. Registration of a user is done with predetermined attributes, which may be, for example, (1) a sports package and (2) watching time between 8:00 am to 2:00 pm, (3) gender and (4) age. Upon registration, these attributes may be part of the encryption, since the broadcaster may generate a formula (some logic function) from the attributes and the public encryption key will include the formula. This way, for example, only users that belong to a group of men in the age of 40-42 which are subscribers of sports package that is broadcasted between 8:00 am to 2:00 pm will be able to decrypt the message.

It is also possible to use Key Policy Attribute Based Encryption (KP-ABE) scheme. In this scheme, data is associated with the attributes for which a public key is defined for each. A broadcaster, who encrypts the data, is associated with the set of attributes to the data or message by encrypting it with a public key). In this scheme, the broadcaster encrypts with the attributes without the formula, while the decryption keys have the formula.

In one embodiment, ABE schemes may further include permanent revocation, which is directed to subscribers. For example, a user who stopped paying for the subscription will not be able to decrypt following massages, regardless its attributes.

In another embodiment, the ABE schemes may further include permanent revocation, which is directed only to specific attributes of users. This may be done by totally revoking their ability to decrypt and to provide him with a new secret key, which will allow him to decrypt messages that do not correspond to these specific attributes.

In another embodiment, the abovementioned functionality, permanent revocation of users' specific attributes can be done directly in the revocation mechanism without the need of providing new secret keys.

Description of the Revocation Process

The key manager runs a setup stage to generate system parameters including a Master Secret Key (MSK), which he retains, and a public key which is published. The key manager also performs key generation to create a secret key for each user in the system. It is assumed that a user receives the secret key in a secure, out-of-band method, e.g. by establishing a Virtual Private Network (VPN) between the key manager and the user.

A broadcaster executes the encryption algorithm which takes a set of temporarily revoked users as one of its parameters and outputs a ciphertext. A user can decrypt this ciphertext if and only if it is not one of the temporarily revoked users. The key manager performs the revocation algorithm which enables each of the non-revoked users to run key update and derive new secret keys. The revoked users will not be able to update their keys and will be unable to decrypt any ciphertexts in the future. However, it is always possible for a user to go through the key generation process again, receiving fresh keys.

The proposed scheme combines attributes from public-key temporary revocation systems and symmetric-key permanent revocation systems. A possible approach is to merge the two system types together in the sense of having each user hold independent keys for each system. The broadcaster secret shares each message and encrypts one share with the temporary revocation system and the other share with the permanent revocation system. Then a legitimate user can decrypt both shares and a revoked user will be unable to decrypt. However, this approach is not sufficiently secure when considering collusion between users who are only temporarily revoked and users who are only permanently revoked.

As an alternative to merging, the disclosed system merges the keys of the two schemes and modifies the six algorithms appropriately, to ensure correctness. It is proved that the construction is secure based on a two-step hybrid argument. The first step relies on the hardness of a novel computational problem which is formalized as the Mixed Exponent Assumption (MEA) and the second step is secure in the generic bilinear group model (disclosed, for example, in WO 2013/027206).

In this model (which is an idealized cryptographic model), an adversary can gain access only to random encoding of a group. The model includes an oracle (a virtual machine which is able to solve certain decision problems in a single operation) that executes the group operation and takes two encodings of group elements as input and outputs an encoding of a third element.

MEA is similar to discrete-log based hardness assumptions in that its input includes powers of a generator g of a group G with prime order p. The group elements in MEA (as in other hardness assumptions) are not independently chosen. There are correlations between the exponents of different group elements. Unlike other assumptions, the input of MEA also includes functions of these exponents directly in $Z_p$. Intuitively, any combination of the elements in G and the elements in $Z_p$ is indistinguishable from a random element. In more detail, MEA states that the following problem is computationally hard.

Let $Y \in Z_p^m$ be a vector of secrets, let V, $U \in Z_p^n$, let A be a n×m matrix, let F be a sequence of k multivariate polynomials over Y and let $H \in G^k$. Then, it is hard to distinguish between the pairs (V,H) and (U,H) if:

V=AY,U is randomly sampled from $Z_p^n$, $H=g^{F(Y)}$, i.e. if H=($h_1, \ldots, h_k$), F=($f_1, \ldots, f_k$) and Y=($y_1, \ldots, y_m$) then $h_i = g^{f_i(y_1, \ldots, y_m)}$.

There does not exist a low-degree, multivariate polynomial p over $Z_p$ such that $p(a_1 f_1 (x_1, \ldots, x_m), \ldots, a_k f_k (x_1, \ldots, x_m))$ is the zero polynomial, where $a_1, \ldots, a_k$ are arbitrary functions of V=($v_1, \ldots, v_n$). If G comes equipped with a bilinear mapping, then p must be of degree two, while otherwise it must be linear.

The MEA assumption is in fact a family of assumptions indexed by a matrix and a sequence of functions. A specific member of this family with matrix A and sequence of functions F is referred as (A,F)-MEA.

The public key and each secret key are of size O(1) group elements. A ciphertext which determines the temporary revocation of r users is of length O(r) group elements and the time complexity of both encryption and decryption is O(r). Similarly, the output of the revocation algorithm, which is used for permanent revocation of r' users is of length O(r') and the time complexity of both the revocation and key update algorithms are O(r').

The disclosed construction benefits performance that enables many commercial applications. One such application can be a platform for broadcasting live events, such as sports matches and concerts. Usually, content providers of such events make their profit (content, not merchandise wise) by selling tickets and recorded videos of the events. With the proposed scheme, they can also make profit by broadcasting the events in real-time and thus reach clients that are unable to attend the events (there are many reasons for that e.g., sold out or too expensive tickets, geographic distance and more). Furthermore, it may help individuals who are unable to attend such events, to enjoy the experience of watching them live at reasonable prices. Another possibility is for content providers to sell the broadcast rights to hang-out venues such as bars and restaurants that may then offer their clients a richer experience and attract more clients.

According to an embodiment of the present disclosure, a revocation scheme that supports both temporary and permanent revocations consists of six algorithms: Setup, KeyGen, Revoke, UpdateKey, Encrypt and Decrypt.

Revocation Systems

In some embodiments, both temporary and permanent revocation schemes consist of six algorithms representing six steps of the scheme: Setup, Key Generation, Revoke, Update Key, Encrypt and Decrypt.

Setup($\lambda$) stage: The Setup algorithm input is a security parameter $\lambda$. The setup algorithm chooses a 3-linear group G of prime order p for $>2^\lambda$. It then chooses random generators $g, w, h \in G$ and random exponents $s, \alpha, b, x_{sb}, x_{\alpha s1}, x_{\alpha 12}, \widetilde{ID}, \hat{x} \in Z_p$. The outputs of the algorithm are the Public Parameters (PP), and the master secret key (MSK), as follows:

$$PP = \left( g^{\hat{x}}, g^{x_{\alpha s1} x_{\alpha s2} \hat{x}}, g^{s x_{sb} \hat{x}}, g^{\frac{b}{x_{sb}}}, g^{\frac{x}{x_{\alpha s1}}}, w^{\frac{\alpha}{x_{\alpha s2}}} \in G \right)$$

$$MSK = (s, \alpha, b, x_{sb}, x_{\alpha s1}, x_{\alpha s2}, \widetilde{ID}, \hat{x} \in Z_p, w \in G)$$

KeyGen(MSK,ID) stage: Given a user identity $ID \in Z_p$ and the master secret key MSK, the algorithm chooses random $t \in Z_p$. It then sets $$D_1 = w^{\frac{\alpha+t}{b}}; D_2 = g^t; D_3 = (w^{ID} h)^t;$$

$$S_1 = g^{\frac{s}{ID-\widetilde{ID}}}; S_2 = (W^{ID} h)^{\frac{s}{ID-\widetilde{ID}}}.$$

The output of this algorithm is $SK_{ID} = \{D_1, D_2, D_3, S_1, S_2\}$.

Revoke(S,PP,MSK) stage: Given a set S of r identities to revoke, the algorithm chooses random $s_1', \ldots s_r' \in Z_p$, sets $s' = s_1' + \ldots + s_r'$, and then for each identity $ID_i \in S$ it sets the following variables:

$$S_{1,ID_i} = g^{s_i'}; S_{2,ID_i} = (w^{ID_i} h)^{s_i t'}; S_{3,ID_i} = ID_i$$

The algorithm then:
1. Updates the master secret key by replacing s+S';
2. Updates the public parameters by replacing $$\left( g^{sb_{sb}\hat{x}}, g^{\frac{x}{x_{\alpha s1}}} \right) \text{ with } \left( g^{(s+s')x_{sb}\hat{x}}, g^{\frac{(s+s')}{x_{\alpha s1}}} \right)$$

respectively;

3. Broadcast the state update message $SUM = \{S_{1,ID_i}, S_{2,ID_i}, S_{3,ID_i}\}_{i=1}^r$.

UpdateKey($SK_{ID}$,SUM,ID) stage: Given a state update message SUM, the algorithm updates the secrety key $SK_{ID}$. It first checks if $ID \in U_{i=1}^r S_{3,ID_i}$, and if so it outputs $\perp$. Otherwise it calculates $$S_1' = \prod_{i=1}^r S_{1,ID_i}^{\frac{1}{ID-S_{3,ID_i}}} = \prod_{i=1}^r g^{\frac{s_i'}{ID-ID_i}}$$

$$S_2' = \prod_{i=1}^r S_{2,ID_i}^{\frac{1}{ID-S_{3,ID_i}}} = \prod_{i=1}^r (w^{ID_i} h)^{\frac{s_i'}{ID-ID_i}}$$

Finally it updates $SK_{ID}$ by setting $S_1 = S_1 \cdot S_1'$ and $S_2 = S_2 \cdot S_2'$.

Encrypt(S,PP,M) stage: This algorithm takes as input a set S of identities to revoke, the public parameters PP and a message $M \in G_T$. The algorithm first chooses a random exponent $x \in Z_p$. Next the algorithm sets:

$$C_0 = M \cdot e\left( g^{\frac{s}{x_{\alpha s1}}}, w^{\frac{\alpha}{x_{\alpha s2}}} (g^{x_{\alpha s1} x_{\alpha s2} \hat{x}})^x \right), C_1 = (g^{\hat{x}})^x, C_2 = (g^{sx_{xb}\hat{x}})^x$$

The output of the Encrypt algorithm is the ciphertext $CT = \{C_O, C_1, C_2\}$

Decrypt($SK_{ID}$,CT,PP) stage: This algorithm is given a secret key $SK_{ID}$, a ciphertext CT and the public parameters PP. If $SK_{ID}$.revoked=true or ID is in the set of revoked users that correspond to CT, the algorithm outputs $\perp$. Otherwise the algorithm begins with calculating A:

$$A =$$

$$\frac{e(S_1, D_3, C_1)}{e(S_2, D_2, C_1)} = \frac{e\left( g^{\frac{s}{ID-\widetilde{ID}}} \cdot \prod_{i=1}^r g^{\frac{s_i'}{ID-ID_i}}, (w^{ID} h)^t, (g^{\hat{x}})^x \right)}{e\left( (w^{\widetilde{ID}} h)^{\frac{s}{ID-\widetilde{ID}}} \cdot \prod_{i=1}^r (w^{\widetilde{ID}} h)^{\frac{s_i'}{ID-ID_i}}, g^t, (g^{\hat{x}})^x \right)} =$$

$$\frac{e\left( \frac{s}{g^{ID-\widetilde{ID}}}, (w^{ID}h)^t, (g^{\hat{x}})^x \right) \cdot \prod_{i=1}^r e\left( e^{\frac{s_i'}{ID-ID_i}}, (w^{ID}h)^t, (g^{\hat{x}})^x \right)}{e\left( (w^{\widetilde{ID}}h)^{\frac{s}{ID-\widetilde{ID}}}, g^t, (g^{\hat{x}})^x \right) \cdot \prod_{i=1}^r e\left( (w^{\widetilde{ID}}h)^{\frac{s_i'}{ID-ID_i}}, g^t, (g^{\hat{x}})^x \right)} =$$

$$\frac{e(g,g,w)^{\frac{sIDt\hat{x}x}{ID-\widetilde{ID}}}}{e(g,g,w)^{\frac{s\widetilde{ID}t\hat{x}x}{ID-\widetilde{ID}}}} \prod_{i=1}^r \frac{e(g,g,w)^{\frac{s_i'IDt\hat{x}x}{ID-ID_i}}}{e(g,g,w)^{\frac{s_i'\widetilde{ID}t\hat{x}x}{ID-ID_i}}} =$$

$$e(g,g,w)^{st\hat{x}x} \prod_{i=1}^r e(g,g,w)^{s_it\hat{x}x} = e(g,g,w)^{(s+s')t\hat{x}x}$$

Finally the Decrypt algorithm calculates M:

$$M = \frac{C_0 \cdot A}{e(C_2, g^{\frac{b}{x_{sb}}}, D_1)} = \frac{M \cdot e\left(g^{\frac{s+s'}{x_{as1}}}, w^{\frac{\alpha}{x_{as2}}}, \left(g^{x_{as1} x_{as2} \hat{x}}\right)^x\right) \cdot e(g, g, w)^{(s+s')tx}}{e\left(\left(g^{s+s'}\right)^x sb\hat{x}\right)^x, g^{\frac{b}{x_{sb}}}, w^{\frac{(\alpha+t)}{b}}\right)} =$$

$$\frac{M \cdot e(g, g, w)^{(s+s')x\hat{\alpha}x} \cdot e(g, g, w)^{(s+s')t\hat{x}x}}{e(g, g, w)^{(s+s')\hat{x}x\alpha + (s+s')\hat{x}xt}} = M$$

The system is required to satisfy the following correctness and security properties:

Correctness:

For all messages M, sets of identities $S, S_1, \ldots S_n$, and all $ID \notin \cup_{i=1}^{n}(S_i \cup S)$, if $(PP_0, MSK_0) \leftarrow \text{Setup}(\lambda), SK_{ID,0} \leftarrow \text{KeyGen(MSK,ID)}$ and for $i=1, \ldots, n$:

$(MSK_i, PP_i, SUM_i) \leftarrow \text{Revoke}(S_i, PP_{i-1}, MSK_{i-1})$ $SK_{ID,i} \leftarrow \text{UpdateKey}(DK_{ID,i-1}, SUM_i, ID)$ then if $CT \leftarrow \text{Encrypt}(S, PP_n, M)$ then Decrypt $(SK_{ID_n}, CT, PP_n) = M$.

The security of a permanent revocation scheme is defined as a game between a challenger and an attack algorithm $\mathcal{A}$ with the following phases:

Setup

The challenger runs the Setup algorithm with security parameter $\lambda$ to obtain the Public Parameters PP and the Master Secret Key MSK. It maintains a set of identities $Q$ initialized to the empty set and then sends PP to $\mathcal{A}$.

Key Query and Revocation

In this phase $\mathcal{A}$ adaptively issues secret key and revocation queries. For every private key query for identity ID, the challenger adds ID to Q, runs KeyGen(MSK,ID)$\rightarrow SK_{ID}$ and sends to $\mathcal{A}$ the corresponding secret key $SK_{ID}$. For every revocation query for a set S of Identities, the challenger updates $Q \leftarrow Q \setminus S$, runs Revoke(S,PP,MSK)$\rightarrow$(MSK',PP', SUM), replaces (MSK,PP) with (MSK',PP') and sends to $\mathcal{A}$ the new PP and the corresponding key update messages SUM.

Challenge $\mathcal{A}$ sends to the challenger a set S of identities and two messages $M_1, M_2$. In case $Q \not\subseteq S$ the challenger sends $\bot$ to $\mathcal{A}$ and aborts. Otherwise, the challenger flips a random coin $\in \{0,1\}$, runs the Encrypt(S,PP,$M_b$) algorithm to obtain an encryption of $M_b$ and sends it to $\mathcal{A}$.

Guess $\mathcal{A}$ outputs a guess $b' \in \{0,1\}$ and wins if $b=b'$.

The advantage $\mathcal{A}$ has in the security game for a permanent revocation scheme with security parameter $\lambda$ is defined as $Adv_{\mathcal{A},\lambda} = |Pr[\mathcal{A} \text{ wins}] - 1/2|$.

A permanent revocation scheme is adaptively secure if for all poly-time algorithms $\mathcal{A}$, $Adv_{\mathcal{A},\lambda} = \text{negl}(\lambda)$.

Selective security is defined similarly, except that the revoked sets of identities are declared by the adversary before it sees the public parameters in an Init phase.

Bilinear Maps

For groups G, $G_T$ of the same prime order p, a bilinear map e: $G^2 \rightarrow G_T$ satisfies:

1. Bilinearity—For every $g_1, g_2 \in G$ and $\alpha \in Z_p$ it holds that $$e(g_1^\alpha, g_2) = e(g_1, g_2^\alpha) = e(g_1, g_2)^\alpha$$

2. Non-degeneracy—If $g_1, g_2 \in G$ are generators of G then $e(g_1, g_2)$ is a generator of $G_T$.

G is called a (symmetric) bilinear group and $G_T$ is called the target group.

Pseudo-Random Functions (PRFs)

Intuitively, a family of Pseudo-Random Functions is a family of functions such that a randomly chosen member of the family cannot be efficiently distinguished from a truly random function by an algorithm that observes the function's output. The following definition states the requirements of a PRF more precisely for the disclosed systems:

Let $(A_\lambda, B_\lambda)_{\lambda \in \mathbb{N}}$ be a sequence of pairs of domains and let $F = \{F_\lambda\}_{\lambda \in \mathbb{N}}$ be a function ensemble such that the random variable $F_\lambda$ assumes values in the set of $A_\lambda \rightarrow B_\lambda$ functions. Then F is a PRF ensemble if:

Pseudo-randomness. For every PPT oracle machine M:

$$|Pr(M^{F_\lambda}(1^\lambda))=1 - Pr(M^{U_\lambda}(1^\lambda))=1| < \text{negl}(\lambda)$$

for a negligible function negl(•) where $U_\lambda$ is distributed uniformly over $A_\lambda \rightarrow B_\lambda$ functions.

Efficient computation. There are efficient PPT algorithms to sample $F_\lambda$ and compute the sampled function on any input.

PRF function families can be efficiently constructed for many useful domains $A_\lambda$, $B_\lambda$ including the groups $Z_n = Z/nZ$ for any integer n. It is noted that in practice a PRF family can be instantiated by a block cipher such as AES where each function in the family corresponds to a cipher key.

Decisional MEA-Assumption

Let G be a group of primt order p with generator g, let $A \in Z_p^{n \times m}$ be a matrix and for a vector of formal variables $X = (X_1, \ldots, X_m)$ define a vector $Y = (Y_1, \ldots Y_n)$ by $AX=Y$. Let $F = (f_1, \ldots f_k) \in Z_p[X_i, \ldots X_m]^k$ be a k-tuple of m-variate poynomials such that for any degree two, k-variate polynomial p and for any k polynomials $\phi_1, \ldots \phi_k \in Z_p[Y_i \ldots Y_n]^k$ the polynomial $p(\phi_1(Y)f_1(X), \ldots \phi_k(Y)f_k(X))$ is not identically zero.

The decisional (A,F)-Mixed exponent problem in G is to distinguish between the distributions on the tuples (g,y,h) and (g,u,h) which are defined as follow. Choose a random $x = (x_1, \ldots x_m) \in Z_p^m$, compute $y = A \cdot x$ and $h = (h_1, \ldots h_k)$ such that $(h_i = g^{f_i(x_1, \ldots x_m)}$ for all i and sample $u \in Z_p^n$, randomly.

An algorithm $\mathcal{D}$ that outputs $\mathcal{Z} \in \{0,1\}$ has advantage $\epsilon$ in solving the Decisional (A,F)-MEA-problem in G if $|Pr[\mathcal{D}(g,A,F,y,h)=1] - Pr[\mathcal{D}(g,A,F,u,h)=1]| \geq \epsilon$.

The Decisional (A,F)-Mixed Exponent Assumption ((A, F)-MEA) holds if any poly-time algorithm has a negligible advantage in solving the Decisional (A,F)-MEA-problem. The MEA family of assumptions is the set of all (A,F)-MEA-assumptions.

Public Key Revocation Scheme

Setup($\lambda$) stage: The setup algorithm, given a security parameter $\lambda$, chooses a bilinear group G of prime order p such that $|p| \geq \lambda$. It then chooses random generators $g, w \in G$, random exponents $\alpha, \gamma, b \in Z_p$ and sets ST=1. Finally, the setup algorithm randomly chooses a function $\phi^s$ from $F_\lambda$, a pseudo-random family of permutations over $Z_p$. The Master secret key MSK is MSK=$(\alpha, b, \gamma, w, ST, \phi)$, and the public parameters PP are PP=$(g, g^{bST}, g^{b^2 ST}, w^b, e(g,g)^{\alpha ST})$.

KeyGen(MSK, ID) stage: Given a user identity $ID \in Z_p$ and the master secret key MSK, the KeyGen algorithm computes $t = \phi(ID) \in Z_p$ and sets $D_1 = g^{-t}, D_2 = (g^{bID} w)^t$, $$D_3 = \frac{1}{\alpha + b^2 t} - \gamma,$$

$D_4 = g^{(\alpha + b^2 t) \cdot ST}$, $D_5$=false.

The output of the KeyGen algorithm is $SK_{ID}=\{D_1, \ldots, D_5\}$.

Revoke(S,PP,MSK) stage: The revoke stage, the state is changed by sending a single message that is sent to all users in parallel. This algorithm is given a set $S=\{ID_1, \ldots, ID_r\}$ of identities to revoke, the public parameters and the master secret key. The algorithm sets ST'=ST and for i=1 to r it computes:

1. $ST'=ST'\cdot(\alpha+b^2 t_i)$

2. $S_{i,1} = \dfrac{1}{\alpha+b^2+t_i} - \gamma, \; S_{i,2} = g^{ST'}$

Where $t_i=\phi(ID_i)$. The Revoke algorithm then performs the following operations:
1. Updates the master secret key by replacing ST with ST';
2. Updates the public parameters by replacing $g^{bST}$, $g^{b^2 ST}$ and $e(g,g)^{\alpha ST}$ with $g^{bST'}$, $g^{b^2 ST'}$ and $e(g,g)^{\alpha ST'}$ respectively.
3. Broadcasts the key update message $SUM=\{S_{i,1},S_{i,2}\}_{i=1}^r$.

UpdateKey $(SK_{ID}, SUM, ID)$ Stage:

During the UpdateKey stage follows the Revoke stage and provides indication regarding how any user updated his state after receiving a Revoke message. Some users will be able to update their state and the remaining users (which should be revoked) will not.

Given a key update message SUM for r revoked identities, the algorithm updates the secret key $SK_{ID}$. It first checks if $D_3 \in \cup_{i=1}^r S_{i,1}$ and if so it sets $D_5$=true. Otherwise, it sets $h_0=D_4$. Then, for i=1 to r it sets $$h_i = \left(\dfrac{S_{i,2}}{h_{i-1}}\right)^{D_3-S_{i,1}}.$$

Finally, the algorithm updates $SK_{ID}$ by replacing $D_4$ with $h_r$.

It should be noted that $h_r=g^{(\alpha+b^2 t)\cdot ST}$ where ST is the new state in the master secret key after the corresponding revocation. For example, if $t=\phi(ID)$ and $\hat{t}=\phi(\widehat{ID})$, the the update process of $SK_{ID}$ after the revocation of $\widehat{ID}$ is:

$$h_1 = \left(\dfrac{S_{1,2}}{h_0}\right)^{D_3-S_{i,1}}$$

$$= \left(\dfrac{g^{\alpha+b^2 \hat{t}}}{g^{\alpha+b^2 t}}\right)^{\left(\frac{1}{\alpha+b^2 \hat{t}}-\gamma\right)-\left(\frac{1}{\alpha+b^2 \hat{t}}-\gamma\right)}$$

$$= \left(\dfrac{g^{\alpha+b^2 \hat{t}}}{g^{\alpha+b^2 t}}\right)^{\frac{(\alpha+b^2 \hat{t})-(\alpha+b^2 \hat{t})}{(\alpha+b^2 t)(\alpha+b^2 \hat{t})}}$$

$$= g^{(\alpha+b^2 t)(\alpha+b^2 \hat{t})}$$

Encrypt(S,PP,M) stage: During the Encrypt stage, the broadcaster who creates the content also encrypts it. The encryption algorithm takes as input the public parameters PP, a message $M \in G_T$ and a set S of revoked identities. The algorithm first lets r=|S|, chooses r random exponents $s_1, \ldots, s_r \in Z_p$ and sets $s=\Sigma_{i=1}^r s_i$.

Next, the algorithm sets $C_0=M\cdot e(g,g)^{\alpha s ST}$, $C_1=g^s$, and for i=1 to r sets $C_{i,1}=ID_i$, $C_{i,2}=(g^{bST})^{s_i}$, $C_{i,3}=(g^{b^2 STID_i} w^b)^{s_i}$.

The output of the algorithm is $CT=\{C_O, C_1, \{C_{i,1}, C_{i,2} C_{i,3}\}_{i=1}^r\}$.

Decrypt$(SK_{ID}, CT, PP)$ stage: The decryption algorithm is given a secret key $SK_{ID}$, a ciphertext CT and the public parameters PP. First, if $D_5$=true or $ID \in \cup_{i=1}^r C_{i,1}$ then the algorithm outputs $\bot$. Otherwise the algorithm calculates:

$$A = e(C_1, D_4) = e(g^s, g^{(\alpha+b^2 t)\cdot ST}) = e(g,g)^{(\alpha s ST)} \cdot e(g,g)^{b^2 stST}$$

$$B = \prod_{i=1}^r (e(C_{i,2}, D_2)\cdot e(C_{i,3}, D_1))^{\frac{1}{ID-C_{i,1}}}$$

$$= \prod_{i=1}^r \left(e\left((g^{bST})^{s_i}, (g^{bID} w)^t\right)\cdot e\left((g^{b^2 STID_i} w^b)^{s_i}, g^{-t}\right)\right)^{\frac{1}{ID-ID_i}}$$

$$= e(g,g)^{\sum_{i=1}^r (b^2 s_i t ST)}$$

$$= e(g,g)^{b^2 st ST}$$

Finally the algorithm retrieves the message:

$M=C_0/(A/B)$

Security Analysis

By simulating a sequence of the security games against an adversary, each one indistinguishable from the next, it can be proved that the disclosed revocation scheme is generically secure over bilinear groups. The first game is the original security game. In the next game the elements correspond to $D_3$ in the secret keys are replaced with random elements. Indistinguishably follows directly from the MEA assumption. In the next game the cipher text is changed to a random element.

Given an adversary $\mathcal{A}$, with non-negligible advantage $\epsilon=ADV_\mathcal{A}$ in the security game against the disclosed construction, a simulator $\mathcal{B}$ is defined that plays the decisional MEA problem.

Let $A=Z_p^{n\times(2n+q+4)}$ be the following matrix:

$$A^{n\times(2n+4+q)} = \begin{pmatrix} -1 & & 0 & \ldots & 0 & \\ -1 & & & & & \\ \vdots & & & I^{n\times n} & & 0 \\ -1 & & & & & \end{pmatrix}$$

Let $(p_1', \ldots, p_7') \in F_p[Y_1, \ldots, Y_m]^7$ be the following polynomials:

$p_1'(Y_1) = Y_1^{-1}$ $p_2'(y_1, Y_2, Y_3) = (Y_1^{-1} - Y_2^{-1}) * Y_3^2$ $p_3'(Y_1) = Y_1^{-2}$ $p_4'(Y_1, Y_2) = Y_1^{-1} * Y_2^{-1}$ $p_5'(Y_1, Y_2, Y_3, Y_4, Y_5) = (Y_2^{-1} * Y_4 + Y_5^{-1})(Y_1^{-1} - Y_2^{-1}) * Y_3^2$ $p_6'(Y_1, \ldots, Y_q) = \sum_{i=1}^q Y_i^{-1}$ $p_7'(Y_1, Y_2, Y_3, Y_4) = (Y_1^{-2} * Y_2 + Y_3^{-1})(Y_4^{-1})$ Let $F=(f_1, \ldots, f_k) \in F_p[X_1, \ldots X_m]^k$ be the following polynomials:

$\forall_{1 \le i \le n} f_{y,i} = p_1'(X_{i+1})$ $\forall_{1 \le i \le n} f_{t1,i} = p_2'(X_{i+1}, X_{n+2}, X_{n+3})$ $fb = p_1'(X_{n+3})$ $fb2 = p_3'(X_{n+3})$ $fwb = p_4'(X_{n+3}, X_{n+4})$ $\forall_{1 \leq i \leq n} f_{t2,i} = p_5'(X_{i+1}, X_{n+2}, X_{n+3}, X_{n+4+i}, X_{n+4})$ $ps = f_6'(X_{2n+5}, \ldots, X_{2n+q+4})$ $\forall_{1 \leq i \leq q} f_{s1,i} = p_4'(X_{n+3}, X_{2n+4+i})$ $\forall_{1 \leq i \leq q} f_{s2,i} = p_7'(X_{n+3}, X_{n+4+i}, X_{n+4}, X_{2n+4+i})$ $fas = p_6'(X_{2n+5}, \ldots, X_{2n+q+4}) p_1'(X_{n+2})$ $\mathcal{B}$ receives an (A,F)-MEA challenge X=(g,A,F,T,h). It then plays the original security game against the adversary. Let $\tau$ be the number of permanent revocation requests that the adversary performs. Let $\rho_i$ denote the number of revoked users in the i-th request. Their identities are denoted by $ID_{ij}$ where i is in $[1, \tau]$ and j is in $[1, \rho_i]$. Similarly, $ST_{i,j}$ is used to denote the state after the revocation of the j-th identity in the i-th group. Let $\psi_i$ denote the number of secret key requests the adversary performs after the i-th permanent revocation request ($\psi_0$ is the number of secret key requests prior to the first revocation). the identities for which the adversary requests keys are denoted by $ID_{k_m}$ where k is in $[0, \tau]$ and m is in $[1, \psi_i]$ and $t_{k,m}$ to denote $f(ID_{k_m})$. Let q denote the number of users the adversary revoke during the temporary revocation. Their identities are denoted by $ID_i$ where i is in $[1, q]$.

Next, the elements that the adversary learns during the security game are written, from which a computational assumption is stated. From the public parameters and revocation requests, the adversary learns $\forall_{i \in [0,\tau], j \in [1,\rho_i]} \quad \frac{1}{ST_{i,j}} - \gamma, g^{ST_{i,j}}, g^{b \cdot ST_{i,j}}, g^{b^2 \cdot ST_{i,j}}, e(g,g)^{\alpha \cdot ST_{i,j}}$ where $ST_{i,j} = \prod_{i'=1}^{i} \prod_{j'=1}^{j} (\alpha + b^2 t_{i'_{j'}}).$ From the secret key requests, the adversary learns $\forall_{k \in [0,\tau], m \in [1,\psi_k]} ID_{k_m}, g^{-t_{k_m}}, (g^{bID_{k_m}} w)^{t_{k_m}}, \frac{1}{\alpha + b^2 t_{k_m}} - \gamma, g^{(\alpha+b^2 t_{k_m}) ST_{k,m}}$ $ST_{k,m} = \prod_{k'=1}^{k} \prod_{m'=1}^{\rho'_k} (\alpha + b^2 t_{k'_{m'}})$ where Finally, from the challenge, the adversary learns $g^s, M \cdot e(g,g)^{\alpha s ST_{final}}$ $\forall_{i \in [1,q]} (g^{BST_{final}})^{s_i}, (g^{b^2 ST_{final} ID_i} w^b)^{s_i}$ where $ST_{final} = \prod_{i=1}^{\tau} \prod_{j=1}^{\rho_i} (\alpha + b^2 t_{i_j})$ For each identity $ID_{k_m}$ the adversary obtains a key that either $ID_{k_m}$ is revoked in one of the $(\tau-k)$ permanent revocations following the creation of $SK_{ID_{k_m}}$, or that $ID_{k_m}$ is revoked in the temporary revocation during the challenge phase. Thus, the next assumption captures the security of the disclosed scheme.

(n-q)-Decisional Multi-Exponent Assumption:

Let $\mathcal{G}$ be a bilinear group of prime order p. For any $(\tau, \rho_1, \ldots, \rho_\tau, \psi_0, \ldots, \psi_\tau)$ such that $\Sigma_{k=0}^{\tau} \psi_k = n$ and $\Sigma_{i=0}^{\tau} \rho_i = n-q$ the (n-q)-Decisional Multi-Exponent problem in $\mathcal{G}$ is as follows:

A challenger chooses generators g, $w \in \mathcal{G}$ and random exponents, $b, \gamma, \{t_{k_m}\}_{k \in [0,\tau], m \in [1,\psi_k]}$. Suppose an adversary is given X=

$\forall_{i \in [0,\tau], j \in [1,\rho_i]} \begin{cases} ID_{ij}, \\ \frac{1}{\prod_{i'=1}^{i} \prod_{j'=1}^{j} (\alpha + b^2 t_{i'_{j'}})} - \gamma, g^{\prod_{i'=1}^{i} \prod_{j'=1}^{j} (\alpha + b^2 t_{i'_{j'}})}, \\ g^{b \cdot \prod_{i'=1}^{i} \prod_{j'=1}^{j} (\alpha + b^2 t_{i'_{j'}})}, g^{b^2 \cdot \prod_{i'=1}^{i} \prod_{j'=1}^{j} (\alpha + b^2 t_{i'_{j'}})}, \\ e(g,g)^{\alpha \cdot \prod_{i'=1}^{i} \prod_{j'=1}^{j} (\alpha + b^2 t_{i'_{j'}})} \end{cases}$ $\forall_{i \in [0,\tau], m \in [1,\psi_k]} \begin{cases} ID_{k_m}, g^{-t_{k_m}}, (g^{bID_{k_m}} w)^{t_{k_m}}, \frac{1}{\alpha + b^2 t_{k_m}} - \gamma, \\ g^{(\alpha + b^2 t_{k_m})} \cdot \prod_{k'=1}^{k} \prod_{m'=1}^{\rho'_k} (\alpha + b^2 t_{k'_{m'}}) \end{cases}$ $g^s$ $\forall_{\ell \in [1,q]} \left( g^{b \cdot \prod_{i=1}^{\tau} \prod_{j=1}^{\rho_i} (\alpha + b^2 t_{i_j})} \right)^{s_\ell},$ $\left( g^{b^2 \cdot \prod_{i=1}^{\tau} \prod_{j=1}^{\rho_i} (\alpha + b^2 t_{i_j}) \cdot ID_\ell} w^b \right)^{s_\ell}$ such that $\frac{\{ID_{k_m}\}_{k \in [0,\tau], m \in [1,\psi_k]}}{\{ID_{ij}\}_{i \in [0,\tau], j \in [1,\rho_i]} \cup \{ID_\ell\}_{\ell \in [1,q]}} = \emptyset$ Then it must be hard to distinguish $T = e(g,g)^{\alpha s \cdot \prod_{i=1}^{\tau} \prod_{j=1}^{\rho_i} (\alpha + b^2 t_{i_j})}$ from a random element $R \in \mathcal{G}_T$. An algorithm $\mathcal{A}$ that outputs $z \in \{0, 1\}$ has advantage $\epsilon$ in solving the (n-q)-Decisional Multi-Exponent problem in g if $Adv^{nqdme}(n, q, A) :=$ $\left| Pr\left[ A\left( X, T = e(g,g)^{\alpha s \cdot \prod_{i=1}^{\tau} \prod_{j=1}^{\rho_i} (\alpha + b^2 t_{i_j})} \right) \right] - Pr[A(X, T = R)] \right| \geq \epsilon$ The decision (n-q)-Decisional Multi-Exponent Assumption holds if no poly-time algorithm has a non-negligible advantage in solving the (n-q)-Decisional Multi-Exponent problem.

In the second game, $\mathcal{B}$ uses the (A,F)-MEA challenge to simulate the security game. The random exponents chosen by the (A,F)-MEA challenger are denoted by $$x = \left(\gamma, \gamma_1, \ldots y_n, \frac{1}{\alpha}, \frac{1}{b}, \frac{1}{w}, ID_1, \ldots ID_n, \frac{1}{s_1}, \ldots \frac{1}{s_q}\right).$$

$\mathcal{B}$ can use h to simulate all the needed group elements since $$\forall_{1 \leq i \leq n} \quad g^{P_{y,i}(x_{i+1})} = g^{\alpha + b^2 t_i}$$

$$\forall_{1 \leq i \leq n} \quad g^{P_{t1,i}(x_{i+1}, x_{n+2}, x_{n+3})} = g^{-t_i}$$

$$g^{pb(x_{n+3})} = g^b$$

$$g^{pb2(x_{n+3})} = g^{b^2}$$

$$g^{pwb(x_{n+3}, x_{n+4})} w^b$$

$$\forall_{1 \leq i \leq n} \quad g^{P_{t2,i}(x_{i+1}, x_{n+2}, x_{n+3}, x_{n+4+1}, x_{n+4})} = g^{(bID_i + b)t_i}$$

$$g^{ps(x_{2n+5}, \ldots, x_{2n+q+4})} = g^s$$

$$\forall_{1 \leq i \leq q} \quad q^{Ps1_i(x_{n+3}, x_{2n+4+1})} = g^{bs_i}$$

$$\forall_{1 \leq i \leq q} \quad g^{Ps2,i(x_{n+3}, x_{n+4+i}, x_{n+4}, x_{2n+4+i})} = g^{(b^2 ID_j + b)s_i}$$

$$e(g, g)^{p\alpha s(x_{2n+5}, \ldots, x_{2n+q+4}, x_{n+2})}) = e(g, g)^{\alpha s}$$

$\mathcal{B}$ taeks $D_3$ elements from T. If T=A×e these elements have the same distribution as in the real security game since $$T_i = \frac{1}{\alpha + b^2 t_i} - \gamma.$$

It follows that the simulation provided by $\mathcal{B}$ is perfect unless T is a random element in $Z_p^n$. Assuming the MEA holds, $\mathcal{A}$ cannot distinguish between the games.

According to one embodiment, the proposed revocation system (which supports both temporary and permanent revocation) may be separated from the broadcasting system (unlike the previous embodiments, in which the keys were part of the broadcasted content). For example, the broadcaster may encrypt the content with a public key and each user will be able to purchase the secret key from a $3^{rd}$ party (such as PayPal), to thereby become a subscriber. In this embodiment, the $3^{rd}$ party will handle all payment issues. The broadcasting system will use the payment data for maintaining users that paid (subscribers) and for updating keys for both revocations.

Figure 1A:
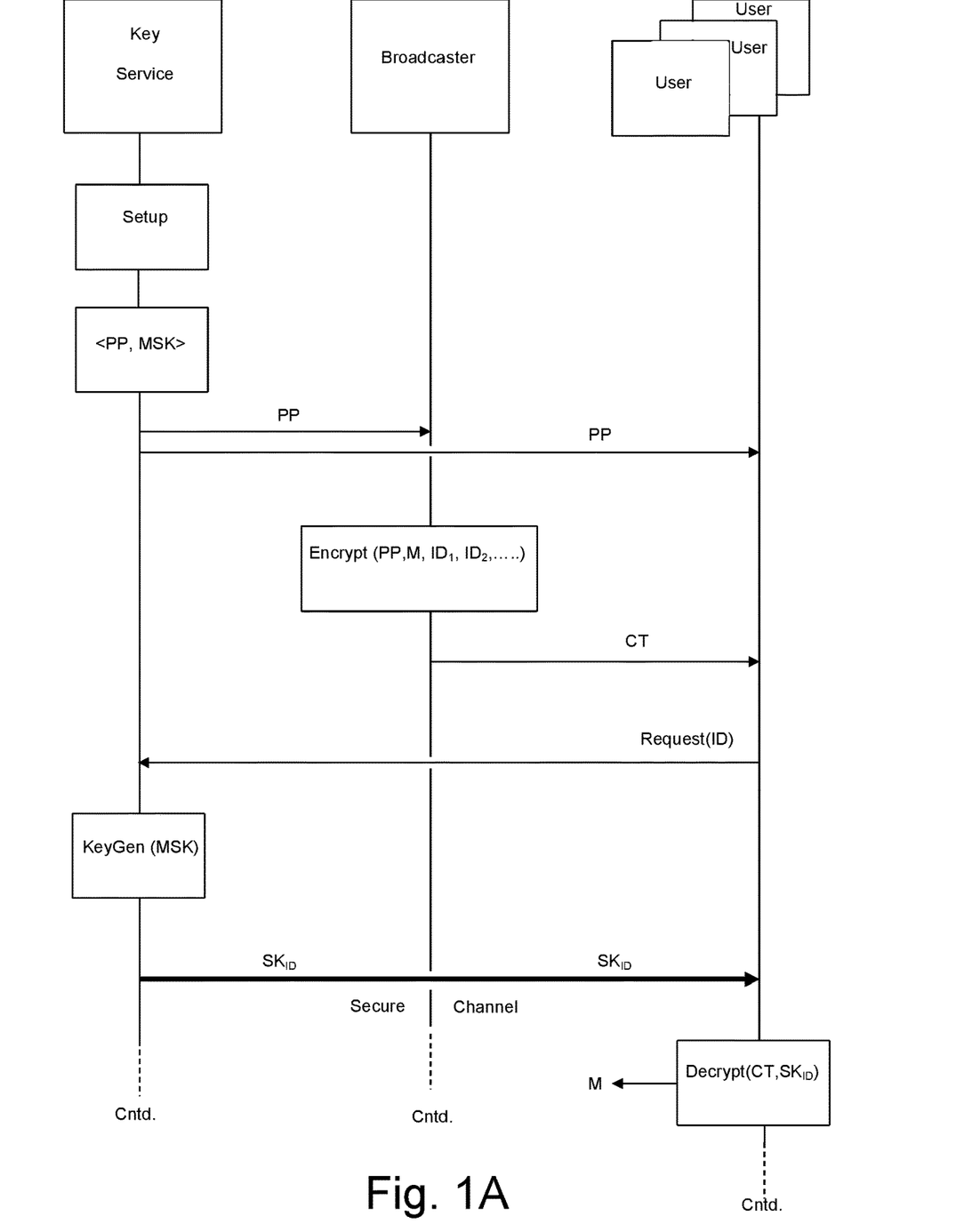
FIG. 1A illustrates the flow of broadcast encryption without revocation.

FIG. 1A illustrates the flow of broadcast encryption without revocation. Accordingly, during a Setup stage, a KeyService generates a public key and a Master Secret Key (MSK). The MSK is kept by the KeyService and the Public Parameters PP (used to generate the public key) are sent to the broadcaster and to all users.

When the broadcaster wishes to send the public key (in the form of a message M, with which he encrypted the content) to all users (subscribers), he uses the Public Parameters PP to create the message M and further creates a CipherText (CT), which is sent to all users. When a user wishes to decrypt the content he received, he sends a request with his $ID_1$ (RequestID$_1$) to the KeyService, which by the KeyGen stage, generates a corresponding secret key $SK_{ID1}$. The secret key $SK_{ID1}$ is sent to the user $ID_1$ via a secure channel. Then the user performs a Decrypt operation using secret key $SK_{ID1}$, decrypt the CipherText (CT) and obtain the message M.

Figure 1B:
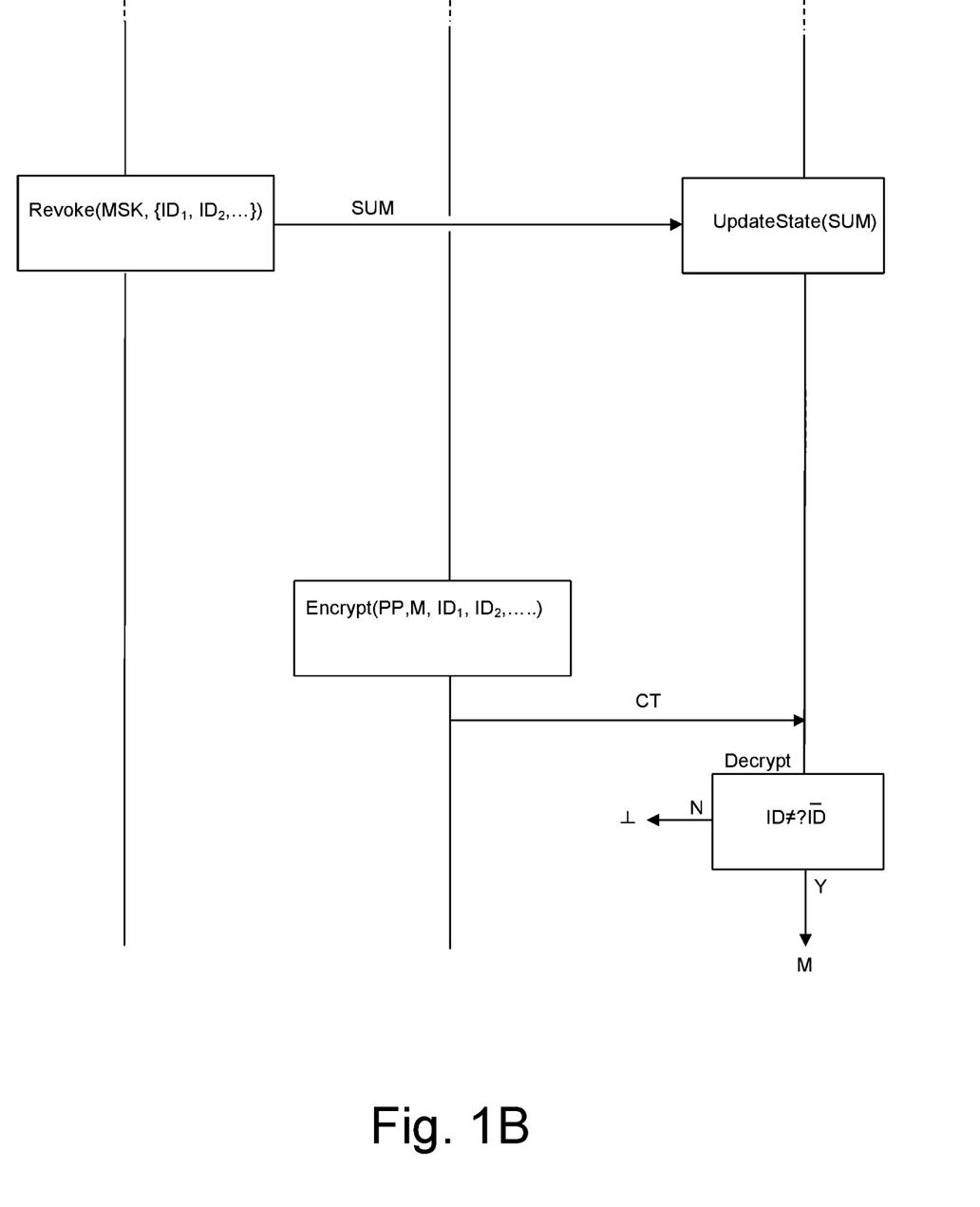
FIG. 1B illustrates the flow of broadcast encryption with permanent revocation capability, using the Revoke stage.

FIG. 1B illustrates the flow of broadcast encryption with permanent revocation capability, using the Revoke stage. Revocation is made with respect to desired k users identities $ID_1$, $ID_2$, . . . $ID_k$, which should be revoked. The algorithm Revoke (MSK, $\{ID_1, ID_2, \ldots, ID_k\}$) provides a State Update Message (SUM) which is sent to all users. Each user tries to update his state with the SUM he received. As a result, the k users with identities $ID_1$, $ID_2$, . . . $ID_k$ will not be able to update their state (and therefore, will be permanently revoked). All the remaining users (admitted users) will be able to update their state and will not be revoked. At the next stage (following state update), the broadcaster will encrypt again with a CT and will send to all user. Then each user will try to decrypt the message. If for a user ID=$ID_1$, that user will not be able to decrypt. Otherwise, he will be able to decrypt (since the current ID is different from the past: ID≠$ID_1$). The permanent revocation is therefore independent of the CT.

If temporary revocation is desired, it is possible to insert a list of IDs ($ID_1$, $ID_2$, . . . $ID_k$), to be revoked into the CT. This way, the same flow may be used for performing temporary revocation, as well.

Figure 2:
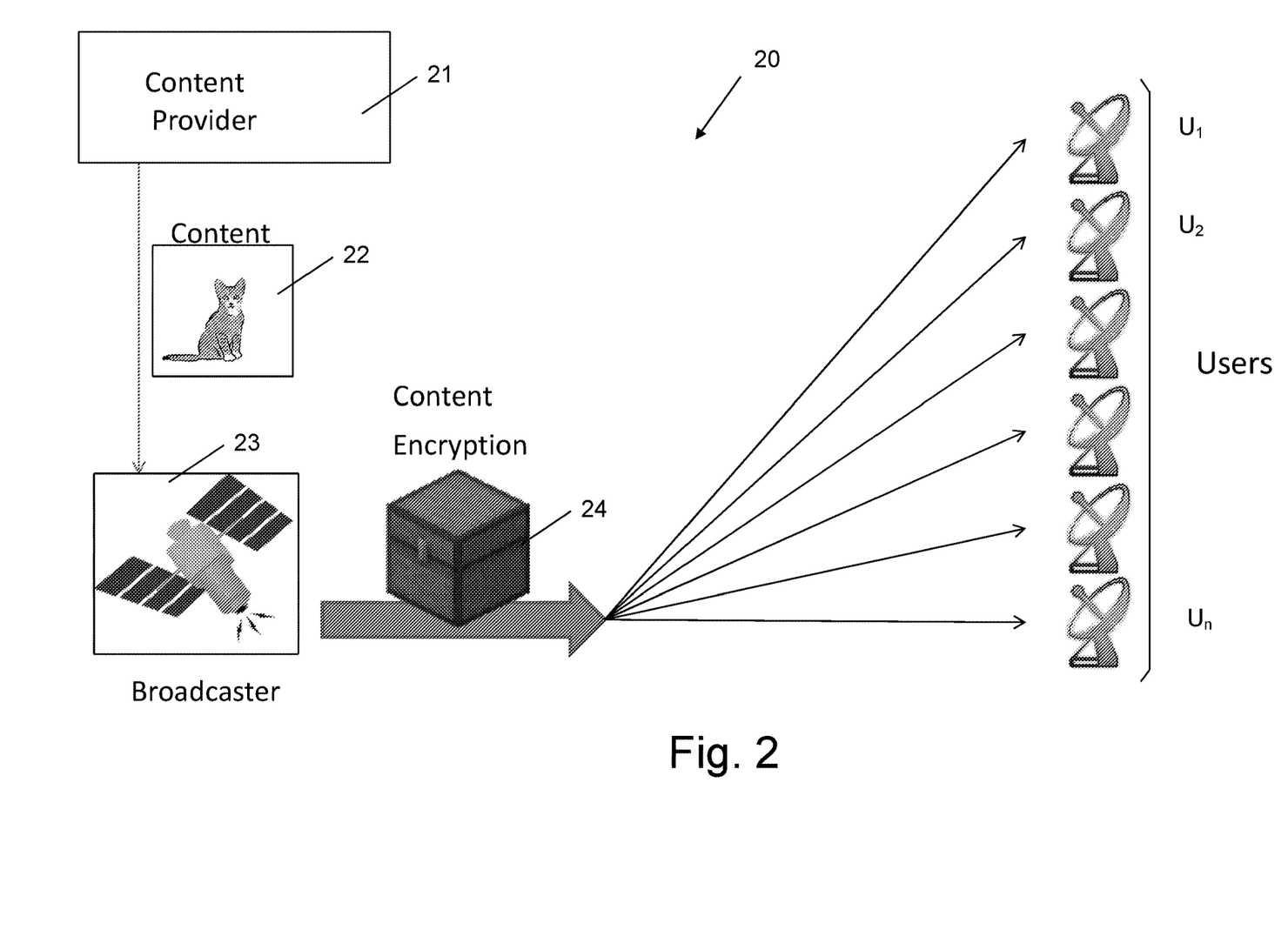
FIG. 2 illustrates a broadcasting system which uses the broadcast encryption with both temporary and permanent revocation capability, according to an embodiment of the invention.

FIG. 2 illustrates a broadcasting system which uses the broadcast encryption with both temporary and permanent revocation capability, according to an embodiment of the invention. The broadcasting system 20 may be for example, a system of a broadcaster 23 (e.g., a satellite TV provider or a cable TV provider), which purchases content 22 (such as movies or TV programs, which are stored on a content server) from a content provider 21, encrypts is with an encryption server 24 and distributes the encrypted content to users $u_1, \ldots, u_n$, which are admitted subscribers. As described above, the broadcaster 23 encrypts the content 22 with a public key, and is able to allow admitted users to decrypt the content they demand and pay for, as well as to remotely perform temporary or permanent revocation of users (subscribers), according to payment and subscription terms that they should fulfil, according to the schemes described above.

The proposed scheme used by the broadcasting system has the following advantages over other schemes:

The system uses a Public-key;
The system supports both Temporary and permanent revocation
Revocation of r users requires O(r) operations
A revocation message comprises O(r) group elements
The Ciphertext and keys are O(1) groups elements
The system is stateful (a stateful server remembers client data (state) from one request to the next and is more efficient because clients do not have to provide full file information every time they perform an operation)
The system is based on Bilinear maps and is secure in the generic bilinear group model
New type of security assumptions—DH-MEA The proposed scheme is more secure, since in case of collusion between revoked users, they will not be able to decrypt. In case of collusion between revoked users and users who can decrypt, at most, they will be able to decrypt the current specific massage but not future messages, as it will require performing successful state update. It is also more efficient, since it does not require using 3-linear groups and can be performed using bi-linear groups.

The KeyService may operate separately from the broadcaster, to handle key generation, distribution, update, as well has to handle all billing issues and payment of subscribers. For example, the KeyService may generate and distribute Keys both to the broadcaster and to users who became subscribers, according to their attributes;
  a) conducting billing operations for admitted users who registered and payed for their subscription; and
  b) using the billing data for maintaining admitted users that paid for subscription, and for revocation of users who stopped paying.

Although embodiments of the invention have been described by way of illustration, it will be understood that the invention may be carried out with many variations, modifications, and adaptations, without exceeding the scope of the claims.

The invention claimed is:

1. A broadcast encryption method that allows a broadcaster to send encrypted content to a set of users such that only a subset of authorized users can decrypt said content, and to perform both temporary and permanent revocation of users, comprising:
  a) during a Setup stage:
    a.1) a KeyService generates a public key and a Master Secret Key (MSK) and sends the Public Parameters PP used to generate said public key to a broadcaster and to all users;
    a.2) said broadcaster uses the Public Parameters PP to create a message M, with which said broadcaster encrypts the content, and further creates a CipherText (CT), which is sent to all users;
  b) during a KeyGen stage:
    b.1) whenever a user wishes to decrypt said message M for decrypting said content, said user sends a request with his ID1 to said KeyService;
    b.2) said KeyService generates a corresponding secret key $SK_{ID1}$;
    b.3) said secret key $SK_{ID1}$ is sent to the user ID1 via a secure data channel;
  c) during a Decrypt stage, said user uses said secret key $SK_{ID1}$, to decrypt the CipherText (CT) and obtain said message M; and
  d) during a Revoke stage of k users (k=1, 2, 3, ... ):
    d.1) providing a State Update Message (SUM) which is sent to all users;
    d.2) allowing each user to update his state with said SUM he received, such that said k users having identities $ID_1, ID_2, \ldots ID_k$ will not be able to update their state and will be permanently revoked, while all the remaining users being admitted users will be able to update their state and will not be revoked;
  wherein said revocation is carried out using a Public Key Revocation Scheme, consisting of:
  A) a Setup ($\lambda$) algorithm, which for a security parameter $\lambda$:
    A.1) chooses a bilinear group G of prime order p such that $|p| \geq \lambda$;
    A.2) chooses random generators g, w∈G, random exponents $\alpha, \gamma, b \in Z_p$ and sets ST=1;
    A.3) randomly chooses a function $\phi^s$ from $F_\lambda$, a pseudo-random family of permutations over $Z_p$, wherein the Master secret key MSK is MS=($\alpha, b, \gamma, w, ST, \phi$), and the public parameters PP are PP=(g, $g^{bST}$, $g^{b^2 st}$, $w^b$, $e(g,g,)^{\alpha ST}$);
  B) a KeyGen(MSK, ID) algorithm, which for Given a user identity ID∈$Z_p$ and the master secret key MSK:
    B.1) computes=$\phi(ID) \in Z_p$; and
    B.2) sets $D_1 = g^{-t}, D_2 = (g^{bID} w)^t$, $$D_3 = \frac{1}{\alpha + b^2 t} - \gamma,$$

$D_4 = g^{(\alpha + b^2 t) \cdot ST}, D_5 = \text{false}$;
    b.3) outputs $SK_{ID} = \{D_1, \ldots, D_5\}$;
  C) a Revoke(S, PP, MSK) algorithm, which is adapted to:
    C.1) change the state is by sending a single message that is sent to all users in parallel; given a set $S = \{ID_1, \ldots, ID_r\}$ of identities to revoke, the public parameters and the master secret key; the algorithm sets ST'=ST and for i=1 to r , computes:

$$ST' = ST' \cdot (\alpha + b^2 t_i)$$
$$S_{i,1} = \frac{1}{\alpha + b^2 t_i} - \gamma, S_{i,2} = g^{ST'}$$

C.2) whenever $t_i = \phi)(ID_i)$, perform the following operations:
      update the master secret key by replacing ST with ST';
      update the public parameters by replacing $g^{bST}, g^{b^2 ST}$ and and $e(g,g)^{\alpha ST}$ with $g^{bST'}$, $g^{b^2 ST'}$ and $e(g,g)^{\alpha ST'}$ respectively;
      broadcast the key update message SUM={$S_{i,1}$, $S_{i,2}\}_{i=1}^r$;
  D) an UpdateKey ($SK_{ID}$, SUM, ID) algorithm, which is adapted to:
    D.1) follow the Revoke stage and provides indication regarding how any user updated his state after receiving a Revoke message;
    D.2) given a key update message SUM for r revoked identities, update the secret key $SK_{ID}$;
  E) an Encrypt(S, PP, M) algorithm for allowing the broadcaster who creates the content also encrypts it, based on the public parameters PP, a message M∈$G_T$ and a set S of revoked identities as an input
  F) a Decrypt($SK_{ID}$, CT, PP) algorithm which attempts to retrieve the message M, based on a secret key $SK_{ID}$, a ciphertext CT and the public parameters PP.

2. The method according to claim 1, further comprising performing temporary revocation by inserting a list of IDs ($ID_1, ID_2, \ldots ID_k$) to be revoked into the CT.

3. The method according to claim 1, wherein the revocation scheme is Cipher-text Policy Attribute-Based Encryption (CP-ABE).

4. The method according to claim 3, wherein the CP-ABE scheme further includes permanent revocation parameters, which are directed to specific users.

5. The method according to claim 3, wherein the CP-ABE scheme further includes permanent revocation parameters, which are directed to specific attributes of specific users.

6. The method according to claim 1, wherein a user can decrypt the ciphertext only if he is not one of the temporarily revoked users.

7. The method according to claim 1, wherein permanent revocation of specific attributes of users is done directly in the revocation mechanism, without the need of providing new secret keys.

8. A broadcast encryption system that allows a broadcaster to send encrypted content to a set of users such that only a subset of authorized users can decrypt said content, and to perform both temporary and permanent revocation of users, comprising:
  a) a broadcasting server, being an electronic device which is operable to:
    a.1) obtain content to be distributed to said authorized users;
    a.2) obtain encryption and decryption keys required for encrypting said content from a KeyService server;
    a.3) encrypt said content and distributing said content to said authorized users, wherein said broadcasting and KeyService servers are electronic devices which are operable to:
  b) during a Setup stage:
    b.1) said KeyService generates a public key and a Master Secret Key (MSK) and sends the Public Parameters PP used to generate said public key to a broadcaster and to all users;
    b.2) said broadcaster uses the Public Parameters PP to create a message M, with which said broadcaster encrypts the content, and further creates a CipherText (CT), which is sent to all users;
  c) during a KeyGen stage:
    c.1) whenever a user wishes to decrypt said message M for decrypting said content, said user sends a request with his ID1 to said KeyService;
    c.2) said KeyService generates a corresponding secret key $SK_{ID1}$;
    c.3) said secret key $SK_{ID1}$ is sent to the user ID1 via a secure data channel;
  d) during a Decrypt stage, said user uses said secret key $SK_{ID1}$, to decrypt the CipherText (CT) and obtain said message M; and
  e) during a Revoke stage of k users (k=1, 2, 3, . . .):
    e.1) providing by said KeyService, a State Update Message (SUM) which is sent to all users;
    e.2) allowing each user to update his state with said SUM he received, such that said k users having identities ID1, ID2, . . . IDk will not be able to update their state and will be permanently revoked, while all the remaining users being admitted users will be able to update their state and will not be revoked;
  wherein said revocation is carried out using a Public Key Revocation Scheme, consisting of:
  A) a Setup($\lambda$) algorithm, which for a security parameter $\lambda$:
    A.1) chooses a bilinear group G of prime order p such that $|p| \geq \lambda$;
    A.2) chooses random generators $g, w \in G$, random exponents $\alpha, \gamma, b \in Z_p$ and sets ST=1,
    A.3) randomly chooses a function $\phi^8$ from $F_\lambda$, a pseudo-random family of permutations over $Z_p$, wherein the Master secret key MSK is MSK=($\alpha$, b,$\gamma$,w,ST,$\phi$), and the public parameters PP are PP=$(g, g^{bST}, g^{b^2ST}, w^b, e(g,g,)^{\alpha ST})$;

B) a KeyGen(MSK, ID) algorithm, which for a Given a user identity $ID \in Z_p$ and the master secret key MSK:
    B.1) computes=$\phi(ID) \in Z_p$; and
    B.2) sets $D_1 = g^{-1} D_2 = (G^{bID} w)^t$, $$D_3 = \frac{1}{\alpha + b^2 t} - \gamma,$$

$D_4 = g^{(\alpha+b^2t) \cdot ST}, D_5$=false:
    B.3) outputs $SK_{ID} = \{D_1, \ldots, D_5\}$;
  C) a Revoke(S, PP, MSK) algorithm, which is adapted to:
    C.1) change the state is by sending a single message that is sent to all users in parallel; given a set S=$\{ID_1, \ldots, ID_r\}$ of identities to revoke, the public parameters and the master secret key; the algorithm sets ST'=ST and for i=1 to r, computes:

$$ST' = ST' \cdot (\alpha + b^2 t_i)$$
$$S_{i,1} = \frac{1}{\alpha + b^2 t_i} - \gamma, S_{i,2} = g^{ST'};$$

C.2) whenever $t_i = \phi(ID_i)$, perform the following operations:
      update the master secret key by replacing ST with ST';
      update the public parameters by replacing $g^{bST}, g^{b^2ST}$ and broadcast the key update message SUM=$\{S_{i,1}, S_{i,2}\}_{i=1}^r$;
  D) an UpdateKey ($SK_{ID}$,SUM,ID) algorithm, which is adapted to:
    D.1) follow the Revoke stage and provides indication regarding how any user updated his state after receiving a Revoke message;
    D.2) given a key update message SUM for r revoked identities, update the secret key $SK_{ID}$;
  E) an Encrypt(S, PP, M) algorithm for allowing the broadcaster who creates the content also encrypts it, based on the public parameters PP, a message $M \in G_T$ and a set S of revoked identities as an input;
  F) a Decrypt($SK_{ID}$,CT,PP) algorithm which attempts to retrieve the message M, based on a secret key $SK_{ID}$, a ciphertext CT and the public parameters PP.

9. The broadcast encryption system according to claim 8, in which the KeyService operates separately from the broadcaster, and performs one or more of the following:
  c) generating and distributing Keys both to the broadcaster and to users who became subscribers, according to their attributes;
  d) conducting billing operations for admitted users who registered and paid for their subscription; and
  e) using the billing data for maintaining admitted users that paid for subscription, and for revocation of users who stopped paying.

* * * * *